US008629940B2

(12) United States Patent
Daly

(10) Patent No.: US 8,629,940 B2
(45) Date of Patent: Jan. 14, 2014

(54) APPARATUS, SYSTEMS AND METHODS FOR MEDIA DEVICE OPERATION PREFERENCES BASED ON REMOTE CONTROL IDENTIFICATION

(75) Inventor: Curtis Norman Daly, Denver, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 781 days.

(21) Appl. No.: 12/634,419

(22) Filed: Dec. 9, 2009

(65) Prior Publication Data

US 2011/0134320 A1 Jun. 9, 2011

(51) Int. Cl.
*H04N 5/44* (2011.01)
*H04N 7/173* (2011.01)

(52) U.S. Cl.
USPC ........... 348/734; 348/460; 348/462; 348/552; 348/14.05; 725/46

(58) Field of Classification Search
USPC .............. 348/734, 468, 14.05, 114, 460, 552, 348/462; 725/46, 54, 39; 340/426.13, 4.61; 455/151.1
See application file for complete search history.

(56) References Cited

U.S. PATENT DOCUMENTS

| 6,359,661 | B1 | 3/2002 | Nickum |
| 7,185,355 | B1 | 2/2007 | Ellis et al. |
| 7,429,979 | B2 | 9/2008 | Mears et al. |
| 7,559,071 | B2 | 7/2009 | Takagi et al. |
| 2002/0059588 | A1 | 5/2002 | Huber et al. |
| 2004/0113892 | A1 | 6/2004 | Mears et al. |
| 2008/0189743 | A1 | 8/2008 | Ellis et al. |
| 2009/0233593 | A1 | 9/2009 | Ergen et al. |
| 2009/0233715 | A1 | 9/2009 | Ergen et al. |
| 2010/0100907 | A1* | 4/2010 | Chang et al. ............ 725/46 |

* cited by examiner

*Primary Examiner* — Jefferey Harold
*Assistant Examiner* — Jean W Desir
(74) *Attorney, Agent, or Firm* — Lowe Graham Jones PLLC

(57) ABSTRACT

Remote control signal detection systems and methods are operable to set media device operation preferences in a media device. An exemplary embodiment detects a remote control communication signal transmitted from a remote control, wherein the remote control communication signal includes a unique identifier associated with the transmitting remote control; determines that at least one foreign language preference is associated with the transmitting remote control; and reconfigures information generated by the media device into the preferred foreign language.

20 Claims, 2 Drawing Sheets

APPARATUS, SYSTEMS AND METHODS FOR MEDIA DEVICE OPERATION PREFERENCES BASED ON REMOTE CONTROL IDENTIFICATION

BACKGROUND

Media devices, such as a set top box, a stereo, a television, a computer system, a game system, or the like, are often configured to receive operating instructions from a user via a remote control. The remote control communicates user instructions to the media device using an infrared signal.

Multiple remote controls are able to control the same media device. However, if one of the remote controls is typically operated by a particular user, the controlled media device may not be aware that instructions are being generated by that particular user and communicated to it via that user's remote control.

A user of a remote control will often have preferences with respect to the operation of the media device. When multiple users, using their "own" remote control, operate the same media device, the media device is not able to determine which user is generating the device instructions. If the media device was able to know that a particular user was providing instructions via their remote, then the media device could automatically configure itself in accordance with user preferences associated with that particular user. Accordingly, there is a need in the arts to facilitate recognition of a current user so that the media device may automatically configure itself to operate in accordance with one or more user preferences.

SUMMARY

Systems and methods of setting media device operation preferences in a media device are disclosed. An exemplary embodiment detects a remote control communication signal transmitted from a remote control, wherein the remote control communication signal includes a unique identifier associated with the transmitting remote control; determines that at least one foreign language preference is associated with the transmitting remote control; and reconfigures information generated by the media device into the preferred foreign language.

BRIEF DESCRIPTION OF THE DRAWINGS

Preferred and alternative embodiments are described in detail below with reference to the following drawings.

DETAILED DESCRIPTION

Figure 1:
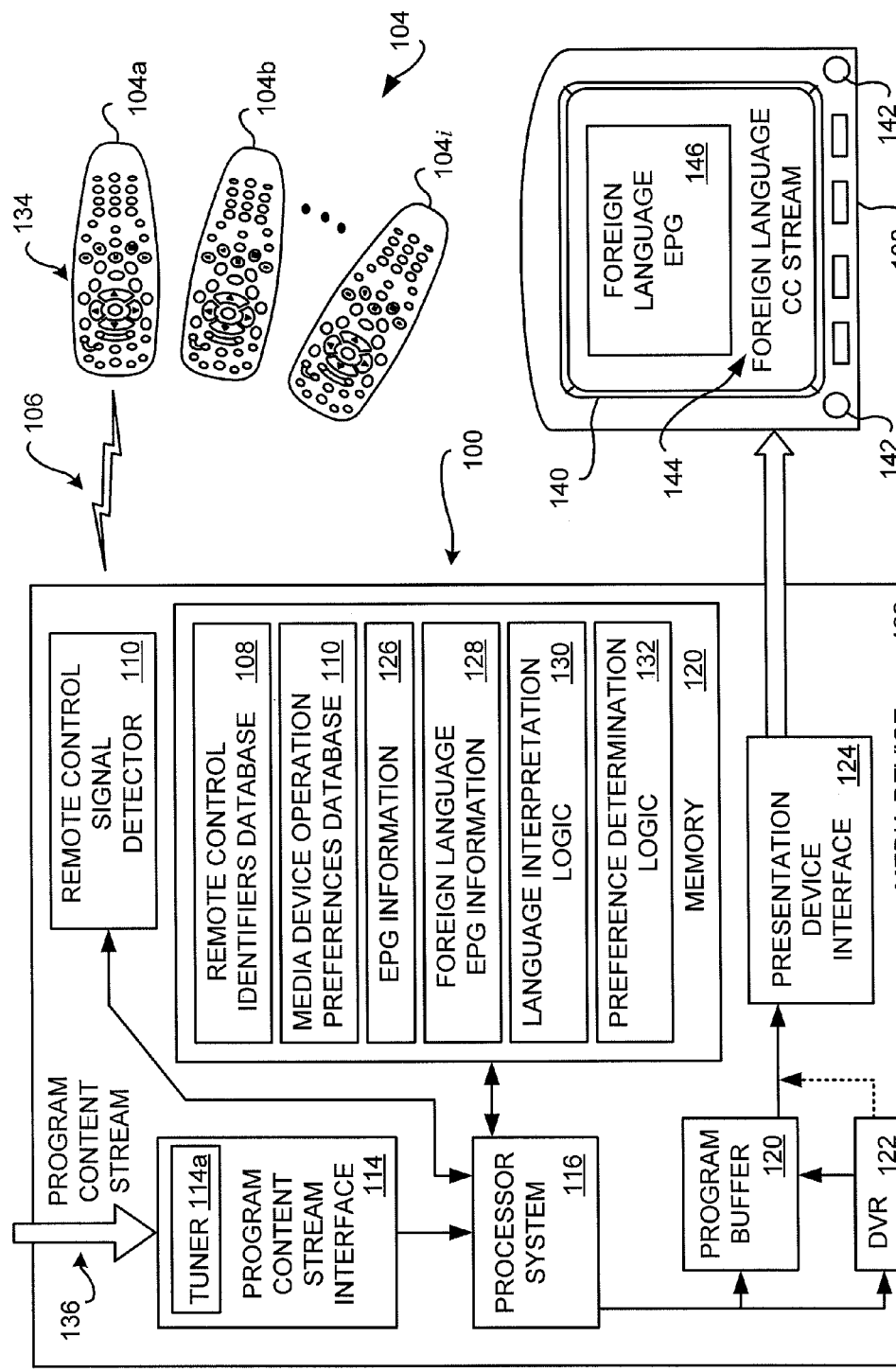
FIG. 1 is a block diagram of an embodiment of a media device operation preferences system implemented in a media device.

FIG. 1 is a block diagram of an embodiment of a media device operation preference system 100 implemented in a media device 102, such as, but not limited to, a set top box (STB). Embodiments of the media device operation preference system 100 may be implemented in other media devices, such as, but not limited to, stereos, radios, televisions (TVs), digital video disc (DVD) players, digital video recorders (DVRs), game playing devices, or personal computers (PCs) that are configured to receive communications from a plurality of remote controls 104.

Embodiments of the media device operation preference system 100 receive a remote control communication signal 106 transmitted from one of the plurality of remote controls 104. For example, the remote control 104a is illustrated as transmitting the remote control communication signal 106 to the media device 102.

A unique identifier of the transmitting remote control 104, and user defined instructions, are encoded into the transmitted remote control communication signal 106. The unique identifier in the remote control communication signal 106 that identifies the remote control 104 may be the serial number, an assigned device identifier, a user defined identifier, a user selected identifier, or any suitable identifier that is associated with the remote control 104 transmitting the remote control communication signal 106.

Further, the unique identifier of the remote controls 104 embedded in the remote control communication signal 106 need only be unique with respect to the operating environment in which a particular plurality of remote controls 104 and the media device 102 are operating in, or are expected to be operating in. For example, multiple remote controls 104, each with a unique identifier or a plurality of selectable identifiers, may be provided and/or purchased with a media system. Or, remote controls 104 originating from other media devices and/or media systems may be configured to communicate with the media device 102. So long as the plurality of remote controls 104 that are used to provide instructions to a particular media device 102 have different identifiers, embodiments of the media device operation preference system 100 will be able to distinguish the remote control communication signals 106 transmitted from the different remote controls 104. Accordingly, the embodiments will be able to determine media device operation preferences associated with the particular remote control 104 that is currently transmitting the remote control communication signal 106 to the media device 102. Thus, from an operational viewpoint, each group of remote controls 104 operating to control a particular media device 102 are each identifiable by a unique identifier.

The media device 102 includes a database or the like, referred to as the remote control identifier database 108, that stores identifiers that are used to identify each of the remote controls 104 that have associated media device operation preferences. When the media device 102 receives a remote control communication signal 106, the media device 102 compares the received unique identifier in the received remote control communication signal 106 with the remote control identifier database 108 to determine if the transmitting remote control 104 is one of the remote controls 104 identified in the remote control identifier database 108.

In some instances, the media device 102 may determine that the remote control 104 currently communicating the remote control communication signal 106 is not identifiable based upon the unique identifier information of the remote control identifier database 108. That is, it is not required that all remote controls 104 that are configured to transmit instructions to the media device 102 be included in the remote control identifier database 108. For example, one of the remote controls 104 may be new, and accordingly, have no media device operation preferences associated with it. Or, in the situation where the media device 102 resides in a home with a large family, one of the remote controls 104 may be designated by the family as a "general use" remote, and accordingly, has no associated media device operation preferences.

In response to determining that the particular remote control 104 currently communicating the remote control communication signal 106 to the media device 102 is identifiable in the remote control identifier database 108, then media device 102 determines if any media device operation preferences are associated with the identified remote control 104. In an exemplary embodiment, one or more media device operation preferences that are unique to a particular one of the remote controls 104 are stored in the media device operation preferences database 110. In other embodiments, the media device operation preferences database 110 may reside in a remote memory that is accessible by the media device 102.

Since the media device operation preferences are associated with each of the unique identifiers in the remote control identifier database 108, the media device 102 configures itself to operate in accordance with the media device operation preferences, as specified in the media device operation preferences database 110, for the particular remote control 104 currently communicating the remote control communication signal 106.

A user (not shown) may provide instructions via a particular one of the remote controls 104 that they repeatedly use. That is, a user has a favorite remote control 104 that they use to provide instructions to the media device 102. Other users typically do not use that particular remote control 104. Rather, such other users have access to their own particular remote control 104 (also not used by others), or have access to a general use remote control 104 (that is not identified in the remote control identifier database 108, or that has no media device operation preferences associated with that particular general use remote control 104).

Describing the exemplary media device 102 in greater detail, here a set top box, comprises a remote control signal detector 112, a transport channel interface 114, a processor system 116, a memory 118, a program buffer 120, an optional digital video recorder (DVR) 122, and a presentation device interface 124. The memory 118 comprises portions for storing the remote control identifier database 108, the media device operation preferences database 110, an electronic program guide (EPG) information 126, an optional foreign language EPG information 128, the optional language interpretation logic 130, and the preference determination logic 132. In some embodiments, the language interpretation logic 130 and the preference determination logic 132 may be integrated together, and/or may be integrated with other logic. In some embodiments, the remote control identifier database 108 and the media device operation preferences database 110 may be integrated together, and/or may be integrated with other databases. Other media devices may include some, or may omit some, of the above-described media processing components. Further, additional components not described herein may be included in alternative embodiments.

The user generates instructions by operation of a plurality of actuators 134, such as the exemplary buttons, residing on their favorite remote control 104. Upon receipt of the remote control communication signal 106 transmitted from their favorite remote control 104, the media device 102 configures itself, and/or the various other media devices that it is communicatively coupled to, in accordance with media device operation preferences predefined in the media device operation preferences database 110.

The functionality of the exemplary media device 102 is now broadly described. A program provider provides program content that is received in one or more program content transport channels 136. A program content transport channel 136 is an information stream comprising a plurality of programs multiplexed together. The one or more program content transport channels 136 are communicated to the media device 102 from a media system sourced from a remote head end facility (not shown) operated by a media provider. Non-limiting examples of such media systems include satellite systems, cable systems, and the Internet. For example, if the program provider provides programming via a satellite-based communication system, the media device 102 is configured to receive one or more broadcasted satellite signals detected by an antenna (not shown) that is communicatively coupled to the media device 102.

The program content transport channels 136 are received by the transport channel interface 114. One or more tuners 114a in the transport channel interface 114 selectively tune to one of the program content transport channels 136 in accordance with instructions received from the processor system 116. The processor system 116, based upon a request for a program of interest specified by the user, parses out program content associated with the program of interest. The program of interest is then assembled into a stream of video and/or audio information which may be stored by the program buffer 120 such that the program content can be streamed out to the media presentation device 138, via the presentation device interface 124. Alternatively, or additionally, the parsed out program content may be saved into the DVR 122 for later presentation.

In this simplified embodiment, the presentation device interface 124 is illustrated as coupled to a single exemplary media presentation device 138, such as a television, monitor, or the like. The video portion of the streamed program content is displayed on the display 140 and the audio portion of the streamed program content is reproduced as sounds by the speakers 142. In other situations, the media device 102 may be coupled to a specialized sound system (not shown).

Some programs of interest include multiple audio portions, each in a different language. For example, but not limited to, a program of interest may include audio in the English, Spanish, and French languages. Accordingly, the user may select a particular language for the audio portion of the program of interest.

Further, some programs of interest may include a closed captioning stream of text that is presented on the display 140. The closed captioning stream presents written text that generally corresponds with, and is substantially in synchronization with, the audio portion of the program of interest. Thus, a hearing impaired user may read the closed captioning portion of the program of interest as the video portion is being presented on the media presentation device 138. Some programs of interest include multiple closed captioning streams, each in a different language. For example, but not limited to, a program of interest may include a foreign language closed captioning (CC) stream 144 in the English, Spanish, and/or French languages.

The exemplary media device 102 illustrated in FIG. 1 is configured to present a requested program of interest on the media presentation device 138. To assist the user to select a program of interest for presentation and/or for recording programming content into the DVR 122, the media device 102 is configured to generate an electronic program guide (EPG) that is presented on the display 140. The EPGs are presented on the display 140 to assist a user to select programming of interest. The EPG is a type of a user interface that presents a menu, or a series of menus, that use a combination of text and symbols to indicate program content viewing choices that may be selected by the user.

Typically, the EPG has the look and feel of a table with information describing available programs. The available program information may include the title of available programming, along with the scheduled time and date of the program presentation. A brief description of the program may also be provided on the EPG. The EPG typically indicates the "channel" of the available program. The channel identifies the originating source of the program, such as a television studio, a premium movie provider, a national program provider, etc.

EPGs are interactive with the user. The user, via their remote control 104 that is in communication with a media device 102 that is controlling presentation of the EPG on the display, is able to "scroll" or "navigate" about the EPG to select a program of interest. When the user highlights the portion of the EPG corresponding to a program of interest using their remote control 104, the user may actuate one or more actuators 134 to cause the media device 102 to perform a function relative to the selected program of interest. For example, if the program of interest is scheduled to begin, or is currently available, the user may select the program of interest for immediate presentation on the display 140. Alternatively, or additionally, the user may have the media device 102 record and store the program of interest in the DVR 122 such that the user may later view the program at a more convenient time.

Information used to generate an EPG resides in the EPG information 126 portion of the memory 118, or in another suitable memory medium. Since information describing all available programming information is too large to be presented all at once on the display 140, the media device 102 generates an EPG that presents a small portion of programming information that is relevant to the user. For example, programming information for a selected channel (and optionally adjacent channels or related channels), over a selected period of time, is gathered from the EPG information 126 for generation of the displayed EPG. The user is then able to scroll about the EPG, changing by channel, time, and/or day, so that information of interest to the user is presented on the displayed EPG. Periodically, the information residing in the EPG information 126 is updated by the program provider.

Typically, the information stored in the EPG information 126 is in a particular native language. For example, in the United States, the programming information is typically provided by the program provider in English. Thus, EPGs are presented in English. However, some program providers may provide the EPG information in one or more foreign languages. For example, the programming information may be available in the English, Spanish, and/or French languages. Thus, based upon a request by the user, a foreign language EPG 146 may be presented on the display 140.

Alternatively, some embodiments may include the optional language interpretation logic 130 that is configured to translate native language programming information into foreign language programming information. For example, a user may be more comfortable with the Spanish language rather than the available English native-language programming information. Since this user prefers the Spanish language, the foreign language EPG 146 can be based upon an interpretation of the available English language programming information into Spanish.

Figure 2:
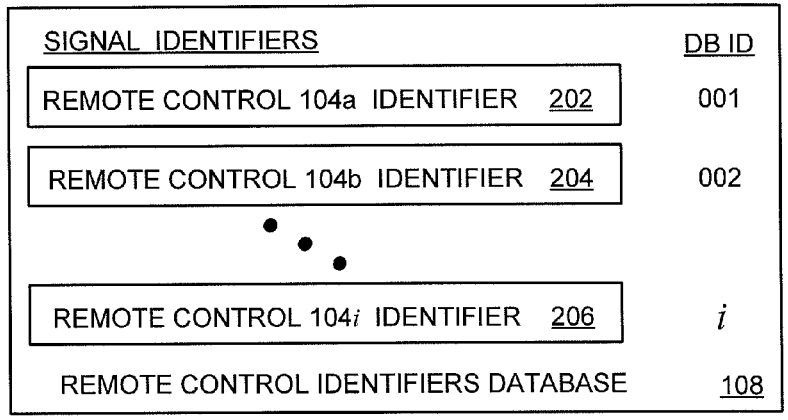
FIG. 2 illustrates an exemplary remote control identifier database.

An exemplary embodiment employs a database management system to associate media device operation preferences with a particular one of the remote controls 104. FIG. 2 illustrates an exemplary remote control identifier database 108. In the exemplary remote control identifier database 108, a first database identifier (DB ID) "001" is associated with a first unique identifier 202 corresponding a first remote control 104a (FIG. 1). A second database identifier (DB ID) "002" is associated with a second unique identifier 204 corresponding to a first remote control 104b. Any suitable number of remote controls 104 may be identified in the remote control identifier database 108. Here, a last database identifier (DB ID) is "00i" is associated with a unique identifier 206 corresponding to a first remote control 104i. Any suitable DB ID may be used in the various embodiments.

In the various embodiments, operation of the media device 102, and other media devices communicatively coupled to the media device 102, is based on predefined, default operating functions. A particular operating function defines how a media device is to operate absent a user instruction that changes that function from the default operating function.

In the various embodiments, the media device 102 checks the unique identifier embedded in the received remote control communication signal 106 with the unique identifiers of the remote controls 104 listed in the remote control identifier database 108. If the unique identifier embedded in the received remote control communication signal 106 matches with one of the unique identifiers of the remote controls 104 identified in the remote control identifier database 108, the media device 102 understands that there may be one or more specified media device operation preferences specified in the media device operation preferences database 110. Accordingly, the media device 102 retrieves the specified media device operation preferences from the media device operation preferences database 110, and then automatically adjusts the corresponding operating functions that control operation of the media device 102 and/or operation of other media devices that are communicatively coupled to the media device 102

For example, presentation of an EPG on the display 140 may be based on the English language, unless otherwise instructed to present the foreign language EPG 146. As another example, the audio portion of a selected program of interest may be defaulted to the English language. Instructions may be received from one of the remote controls 104 requesting the Spanish language (assuming that the foreign language audio portion is available from the program provider), thereby causing the media device 102 to configure the program of interest so that the audio portion of the program of interest is presented in Spanish. In the event that a particular remote control 104 that is associated with a preference for Spanish language audio is received by the media device 102, embodiments cause the media device to provide Spanish language audio.

As yet another example, the closed captioning portion of a selected program of interest may be defaulted to English language text. If an instruction is received from one of the remote controls 104 that is associated with a media device operation preference for presentation of Spanish language closed captioning text (assuming that it is available from the program provider), the media device 102 then configures the program of interest so that the closed captioning portion of the program of interest is presented in Spanish text.

Figure 3:
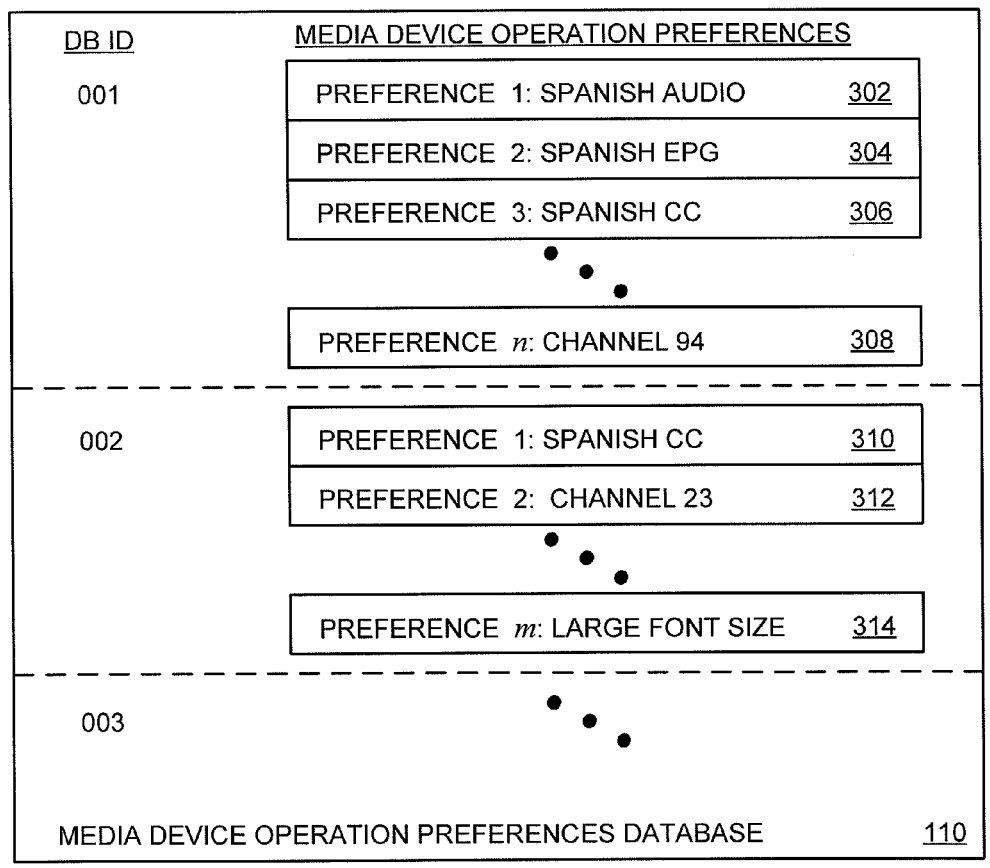
FIG. 3 illustrates an exemplary media device operation preferences database.

FIG. 3 illustrates an exemplary media device operation preferences database 110. In the exemplary media device operation preferences database 110, the DB IDs are associated with media device operation preferences.

Some households may have bilingual members, or may have members who are not conversant in the local native language. For example, "Grandmother" may be fluent in Spanish, and/or have difficulties with the English language. In such a situation, Grandmother could use a selected one of the plurality of remote controls 104 as her "favorite" remote control 104. It is presumed that Grandmother typically uses her favorite remote control 104 to control the operation of the media device 102 and/or to control operation of other media devices that are communicatively coupled to the media device 102. To illustrate, assume that Grandmother uses the remote control 104a, while other members of the household use the other remote controls 104b-104i (FIG. 1).

In FIG. 3, the media device operation preferences database 110 is configured, in part, to cause the media device 102 to automatically access Spanish language audio and/or text when a remote control 104, associated with a user who prefers Spanish, is currently communicating a remote control communication signal 106 to the media device 102. A first media device operation preference 302 indicates a preference for Spanish language audio. A second media device operation preference 304 indicates a preference for presentation of an EPG using the Spanish language. A third media device operation preference 306 indicates a preference for Spanish language closed captioning text. Any number of media device operation preferences may be saved into the media device operation preferences database 110.

A last media device operation preference 308 indicates a preference for Channel 94. For example, this particular media device operation preference 308 could correspond to a favorite channel setting, a last channel viewed setting, a foreign language channel, a channel of interest that is used to determine an initial EPG, a restricted access channel, or any other suitable media device operation preference that is associated with a particular channel.

Embodiments of the media device operation preference system 100 are configured to automatically change selected operating functions of the media device 102, and/or operation of other media devices that are communicatively coupled to the media device 102, from default functions to preferred functions when a remote control communication signal 106 is received from a particular remote control 104 that is associated with media device operation preferences. In the example above, when Grandmother uses her favorite remote control 104a to generate the remote control communication signal 106 that is transmitted to the media device 102, the media device 102 automatically configures itself (and/or the various other media devices that it is communicatively coupled to) to operate using the Spanish language. For example, the audio portion of a program of interest may be changed to Spanish. Additionally, or alternatively, closed captioning information may be changed so that, if presented on the display 140, a Spanish language text version of the foreign language closed captioning stream 144 is presented on the display 140. Additionally, or alternatively, when Grandmother instructs the media device 102 to generate and present an EPG, the media device 102 automatically generates the foreign language EPG which is then presented on the display 140. If Grandmother actuates one of the actuators 134 on her favorite remote control 104a that is associated with a "favorite channel" function and/or a "last viewed channel" function, the media device automatically reconfigures so that Channel 94 is communicated to the media presentation device 138. Here, Channel 94 may be a channel that presents programming in the Spanish language.

Continuing with the above-described example, assume a remote control communication signal 106 is received from Grandmother's favorite remote control 104a with an instruction requesting presentation of an EPG. The media device 102 checks the unique identifier of the remote control 104a (here, identified by reference numeral 202) and determines that the received remote control communication signal 106 originated from the remote control 104a. The associated DB ID is "001" in this example.

In this example, the DB ID "001" is associated with the remote control 104a. The media device 102 then accesses the media device operation preferences database 110 to identify the predefined preferences associated with the DB ID "001" (and thus, are associated with the remote control 104a used by Grandmother). The media device 102 then reconfigures the EPG so that when the EPG is presented on the display 140, the foreign language EPG 146 is presented using Spanish text.

Further, other operating functions may be reconfigured in accordance with the preferences specified in the media device operation preferences database 110. Here, the audio portion of a selected program of interest may be presented in the Spanish language (if a Spanish language audio portion is available). If Spanish closed closed captioning text is available, the foreign language closed captioning stream 144 may be presented in Spanish.

Any number of predefined operating functions may be used to specify user preferences that are associated with a particular remote control 104. In some instances, no preferences may be defined for an identified remote control 104.

Any suitable default operating function can be modified by a media device operation preference. The above simplified example illustrates media device operation preferences that are based on a preferred language to be used for presentation of textual and audio information. As another example of an operating function that may be modified by a predefined preference associated with the second remote control 104b, the media device operation preferences associated with the remote control 104b include a first media device operation preference 310 indicating a preference for presentation of Spanish language closed captioning text. To illustrate the distinction from the above-described favorite remote 104a of Grandmother, consider her young grandchild. The native language of the grandchild may be English. To facilitate learning Spanish, Spanish language closed captioning text may be presented on the display 140 when the grandchild is operating the media device using the remote control 104b.

As another illustrative example of the use of media device operation preferences, the second media device operation preference 312 indicates a function is to be set pertaining to Channel 23. Here, assume that Channel 23 provides suitable programming specifically targeted to children. Thus, when the remote control 104b communicates a remote control communication signal 106 to initially turn on the media device 102, the tuner 114a (FIG. 1) may automatically tune to the program content stream having Channel 23 so that that Channel 23 is presented on the media presentation device 138 that is coupled to the media device 102.

As yet another illustrative example of the use of media device operation preferences, the last media device operation preference 314 indicates a function is to be set pertaining to displayed font size on an EPG, closed captioning text, DVR recording lists, caller identification (ID), and/or other graphical displays that employ text. Here, assume that a large text font is easier to read. Thus, when the remote control 104b communicates a remote control communication signal 106 to present an EPG or to present closed captioning text, a larger than normal font is used. This feature may also be a preference of Grandmother in the event that her vision is impaired.

In some embodiments, image zooming could be a media device operation preference. Additionally, or alternatively, volume level of the audio portion of a presented program could be increased when the media device operation preferences are implemented for a particular user. Thus, if Grandmother has a vision and/or hearing impairment, the automatic implementation of her media device operation preferences could increase image size and/or increase volume.

Media device operation preferences can be specified by the user. In some embodiments, the user may actuate a designated one of the actuators 134 on their remote control 104, such that one or more subsequent instructions are saved as a media device operation preference. Alternatively, or additionally, a graphical user interface, a menu, or the like, may be presented to the user. The user may then navigate to and select one or more media device operation preferences of interest that are then stored in the media device operation preferences database 110. The selected media device operation preferences are associated with that particular remote control 104.

In some embodiments, media device operation preferences may be automatically learned by the media device 102. For example, the media device 102 may learn that there is a preference for a foreign language EPG after such a request for foreign language audio or text is made a predefined number of times from the same remote control 104. Learned user preferences are stored in the media device operation preferences database 110 and are associated with that particular remote control 104. Accordingly, the media device 102 may "learn" that when a remote control communication signal 106 is received from that particular remote control 104, the learned media device operation preferences should be implemented at the media device 102 and/or the various other media devices that the media device 102 is communicatively coupled to.

Depending upon the embodiment, selected ones of the media device operation preferences are implemented upon initial receipt of a remote control communication signal 106 for a particular remote control 104.

Other media device operation preferences are configured for selective enabling by the user. In some situations, a particular function may require a relatively long series of actuations of different ones of the actuators 134 on the remote control 104. Embodiments may implement a media device operation preference, which would be similar to a macro-program or the like, which could be selectively implements based on a single instruction from that particular remote control 104. That is, a function of a selected one of the actuators 134 may be modified such that a preference is implemented when the user actuates that particular actuator 134. For example, display of an EPG indicating stored programs of interest on the DVR 122 typically requires a plurality of remote control instructions serially communicated to the media device 102. Accordingly, a media device operation preference could be constructed so that a single instruction could cause presentation of the EPG indicating stored programs of interest on the DVR 122.

In embodiments that employ both the remote control identifier database 108 and the media device operation preferences database 110, the media device may quickly determine if the remote control 104 currently communicating the remote control communication signal 106 has any associated user preferences. In alternative embodiments, the remote control identifier database 108 and the media device operation preferences database 110 are combined into a single database, or combined with other databases.

It should be emphasized that the above-described embodiments of the media device operation preference system 100 are merely possible examples of implementations of the invention. Many variations and modifications may be made to the above-described embodiments. All such modifications and variations are intended to be included herein within the scope of this disclosure and protected by the following claims.

The invention claimed is:

1. A method for setting media device operation preferences in a media device, the method comprising:

receiving streamed program content at the media device having a program of interest therein, wherein the program of interest includes at least a video portion, a native language audio portion and a foreign language audio portion;

detecting, at a remote control signal detector residing in the media device, a remote control communication signal transmitted from a remote control, wherein the remote control communication signal includes a unique identifier that identifies the transmitting remote control;

identifying, at the media device, the remote control based on the unique identifier in the detected remote control communication signal;

determining a language preference that is associated with the identified transmitting remote control based on the unique identifier; and selecting, at the media device, one of the native language audio portion and the foreign language audio portion based on the determined language preference.

2. The method of claim 1, further comprising:

presenting the selected one of the native language audio portion and the foreign language audio portion in response to receiving the remote control communication signal from the transmitting remote control and based on the determined language preference; and concurrently presenting the video portion with the selected one of the native language audio portion and the foreign language audio portion.

3. The method of claim 1, wherein the media device is configured to receive a program of interest with a native language closed captioning text portion and a foreign language closed captioning text portion, and further comprising:

selecting, at the media device, one of the native language closed captioning text portion and the foreign language closed captioning text portion based on the determined language preference; and presenting the selected one of the native language closed captioning text portion and the foreign language closed captioning text portion in response to receiving the remote control communication signal from the transmitting remote control and based on the determined language preference.

4. The method of claim 1, wherein the program of interest includes a native language closed captioning text portion, and further comprising:

translating the native language closed captioning text portion to a foreign language closed captioning text portion corresponding to the determined language preference in response to receiving the remote control communication signal from the transmitting remote control and based on the determined language preference.

5. The method of claim 1, wherein the media device is configured to receive electronic program guide (EPG) information in a native language and a foreign language, and further comprising:

generating an EPG using one of the native language EPG information and the foreign language EPG information in response to receiving the remote control communication signal from the transmitting remote control and based on the determined language preference.

6. The method of claim 5, wherein the remote control communication signal includes at least one instruction requesting presentation of the EPG, and wherein the EPG is presented using the selected one of the native language EPG information and the foreign language EPG information in response to receiving the instruction requesting presentation of the EPG.

7. The method of claim 1, wherein the media device is configured to receive electronic program guide (EPG) information in a native language, and in response to receiving an instruction requesting presentation of an EPG from the transmitting remote control associated with the determined language preference, the method further comprising:
translating the native language EPG information into foreign language EPG information; and
generating the EPG using the foreign language EPG information.

8. The method of claim 1, wherein the media device is configured to receive a foreign language channel that presents at least one program of interest in a foreign language, and in response to selecting the foreign language audio portion based on the determined language preference, the method further comprising:
defining a favorite channel as the foreign language channel in response to receiving the remote control communication signal from the transmitting remote control associated with the determined language preference.

9. A media device, comprising:
a program content stream interface configured to receive a program content stream with a program of interest therein, wherein the received program of interest includes at least a video portion, a native language audio portion and a foreign language audio portion, wherein the native language audio portion and the foreign language audio portion each correspond to the video portion;
a remote control signal detector configured to detect a remote control communication signal, wherein the detected remote control communication signal is transmitted from a remote control, wherein the remote control communication signal operates the media device, and wherein the remote control communication signal includes a unique identifier identifying the transmitting remote control; and
a processor system communicatively coupled to the program content stream interface and the remote control signal detector, and wherein the processor system is configured to:
determine a language preference that is at least one of a native language preference and a foreign language preference associated with the transmitting remote control, wherein the determined language preference is based upon the unique identifier in the detected remote control communication signal;
communicate the video portion and the native language audio portion to a media presentation device for presentation to a user of the remote control in response to determining that the language preference is for the native language preference; and
communicate the video portion and the foreign language audio portion to the media presentation device for presentation to the user of the remote control in response to determining that the language preference is for the foreign language preference.

10. The media device of claim 9, further comprising:
a memory configured to store a plurality of media device operation preferences pertaining to the foreign language preference,
wherein the processor system retrieves at least one of the media device operation preferences associated with the transmitting remote control, and reconfigures the media device to process the received program content stream in accordance with the at least one retrieved foreign language media device operation preference.

11. The media device of claim 9, wherein the program content stream interface is configured to receive a native language closed captioning text portion of the program of interest, and wherein the processor system is configured to translate the native language closed captioning text portion to a foreign language closed captioning text portion in response to the processor system determining that the language preference is for the foreign language preference.

12. The media device of claim 9, wherein the program content stream interface is configured to receive native language electronic program guide (EPG) information and foreign language EPG information, and wherein the processor system is configured to generate an EPG using the foreign language EPG information in response to the processor system determining that the language preference is for the foreign language preference.

13. The media device of claim 12, wherein the remote control communication signal includes at least one instruction requesting presentation of the EPG, and wherein the EPG is presented using the foreign language preference in response to receiving the instruction.

14. The media device of claim 9, wherein the program content stream interface is configured to receive native language electronic program guide (EPG) information, and wherein the processor system is configured to translate the native language EPG information into foreign language EPG information, and wherein the processor system is configured to generate an EPG using the foreign language EPG information in response to the processor system determining that the language preference is for the foreign language preference.

15. The media device of claim 9, wherein the program content stream interface is configured to receive a foreign language channel that presents at least one program of interest in the foreign language, and wherein the processor system is configured to define a favorite channel as the foreign language channel in response to the processor system determining that the language preference is for the foreign language preference.

16. The media device of claim 9,
wherein the remote control is a first remote control having a first unique identifier that is used by the processor system to identify the language preference of the first remote control as the native language,
wherein the remote control communication signal is a first remote control communication signal transmitted from the first remote control that is received at the remote control signal detector,
wherein the remote control signal detector is further configured to receive a second remote control communication signal transmitted from a second remote control, wherein the transmitted second remote control communication signal includes a second unique identifier that is used by the processor system to identify the language preference of the second remote control as the foreign language preference,
wherein response to receiving further transmitted remote control communication signals from the first remote control, the video portion and the native language audio portion are communicated, and
wherein response to receiving the further transmitted remote control communication signals from the second remote control, the video portion and the foreign language audio portion are communicated.

17. The media device of claim 9, wherein the remote control signal detector is configured to receive an infrared (IR) remote control communication signal transmitted from the remote control.

18. A media system comprising, comprising:
a first remote control configured to transmit a first remote control communication signal that is received by a media device, where the transmitted first remote control communication signal includes a first identifier that identifies the first remote control;

a second remote control configured to transmit a second remote control communication signal that is received by the media device, where the transmitted second remote control communication signal includes a second identifier that identifies the second remote control; and the media device, comprising:

a transport content stream interface configured to receive a transport channel from a head end facility operated by a media provider, wherein the transport channel includes a plurality of programs multiplexed together, and wherein the plurality of multiplexed programs include a program of interest defined by at least a video portion, a native language audio portion and a foreign language audio portion, wherein the native language audio portion and the foreign language audio portion each correspond to the video portion;

a remote control signal detector configured to detect the first remote control communication signal when transmitted from the first remote control and to detect the second remote control communication signal when transmitted from the second remote control; and a processor system communicatively coupled to the transport content stream interface and the remote control signal detector, and wherein the processor system is configured to:

determine a native language preference based upon the first identifier in the received first remote control communication signal transmitted by the first remote control;

determine a foreign language preference based upon the second identifier in the received second remote control communication signal transmitted by the second remote control;

communicate the video portion and the native language audio portion to a media presentation device for presentation to a user of the remote control in response to receiving the first remote control communication signal; and communicate the video portion and the foreign language audio portion to the media presentation device for presentation to the user of the remote control in response to receiving the second remote control communication signal.

19. The media system of claim 18, further comprising:

a memory communicatively coupled to the processor system, wherein a media device operation preferences database resides in the memory, and wherein the media device operation preferences database includes at least a first database identifier that corresponds to the first identifier of the first remote control, a first preference that specifies the language preference as the native language preference, a second database identifier that corresponds to the second identifier of the second remote control, a second preference that specifies the language preference as the foreign language preference, where in response to receiving the first remote control communication signal from the first remote control, the first identifier is associated with the first database identifier so that the first preference that specifies the language preference as the native language preference is determined, and where in response to receiving the second remote control communication signal from the second remote control, the second identifier is associated with the second database identifier so that the second preference that specifies the language preference as the foreign language preference is determined.

20. The media system of claim 18, further comprising:

a presentation device interface communicatively coupled to the media presentation device with a display and at least one speaker, wherein a media device operation preferences database resides in a memory, and wherein the media device operation preferences database includes at least a first database identifier that corresponds to the first identifier of the first remote control, a first preference that specifies the language preference as the native language preference, a second database identifier that corresponds to the second identifier of the second remote control, a second preference that specifies the language preference as the foreign language preference.

* * * * *